United States Patent [19]

Whitmore

[11] 4,274,531
[45] Jun. 23, 1981

[54] APPARATUS FOR ORIENTING OBLONG ARTICLES

[76] Inventor: Henry B. Whitmore, Rte. 5, Box 369, San Antonio, Tex. 78211

[21] Appl. No.: 77,856

[22] Filed: Sep. 21, 1979

[51] Int. Cl.$^3$ ............................................. B65G 47/24
[52] U.S. Cl. ................................. 198/397; 198/444; 198/493; 198/528; 198/531
[58] Field of Search ............... 198/389, 396, 397, 443, 198/444, 493, 528, 531, 786

[56] References Cited

U.S. PATENT DOCUMENTS

| 847,451 | 3/1907 | Wilmore | 198/443 X |
|---|---|---|---|
| 2,193,942 | 3/1940 | Shackelford | 198/408 |
| 2,829,761 | 4/1958 | Roeber | 198/409 |
| 2,879,919 | 3/1959 | Knoche | 198/786 X |
| 3,137,529 | 6/1964 | Allen et al. | 198/493 |
| 3,774,806 | 11/1973 | Swart | 198/389 X |
| 3,815,730 | 6/1974 | Zwiep et al. | 198/389 |
| 4,010,841 | 3/1977 | Bonzack | 198/531 X |

*Primary Examiner*—James L. Rowland
*Attorney, Agent, or Firm*—Gunn, Lee & Jackson

[57] ABSTRACT

The device of this invention comprises a drum 11 rotatably mounted on a mounting frame 10. The device is designed to receive articles to be sorted from a controlled feed conveyor 12. The rotating drum 11, through its internal structure including lift fins 16 and associate structure, position the oblong articles on counter-rotating shaft conveyor 13. The articles proceed down the counter-rotating shaft conveyor 13 to a chain link loading mechanism 36 placing the sorted articles in receiving slots on chain link conveyor 37. Incorporated in the invention of this device are control structures such as feed control tilt flaps 20 and their associated structure which controls the rate of supply of articles to the rotating drum 11 by feed conveyor 12 and return rejected articles to the rear of the drum. A detector 29 is incorporated in association with the counter-rotating shaft conveyor 13 and include shaft conveyor light source 30, the shaft conveyor electric eye 31, and clearing means 32. Articles received from counter-rotating shaft conveyor 13 are positioned on the chain link conveyor by chain link loading mechanism 36. The device of this invention is normally designed to operate in conjunction with an automatic wrapping mechanism which is fed by chain link conveyor 37.

15 Claims, 11 Drawing Figures

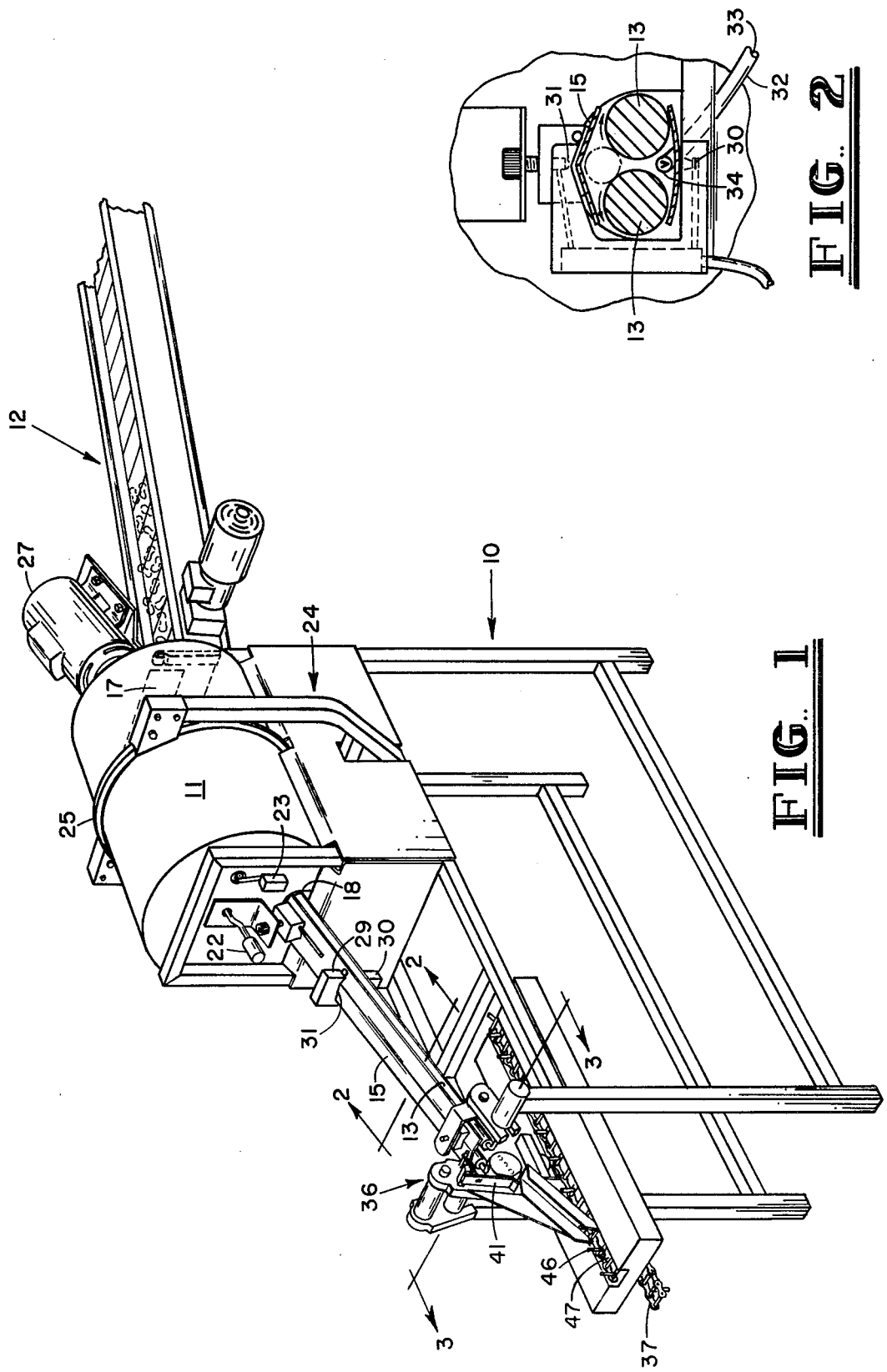

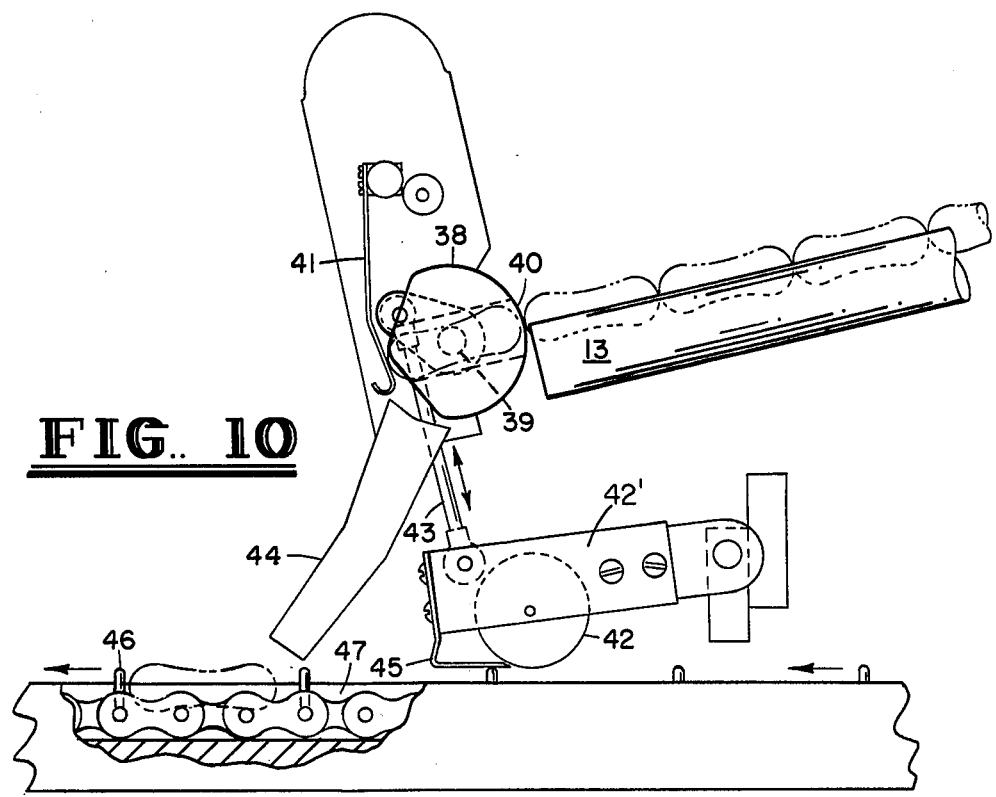
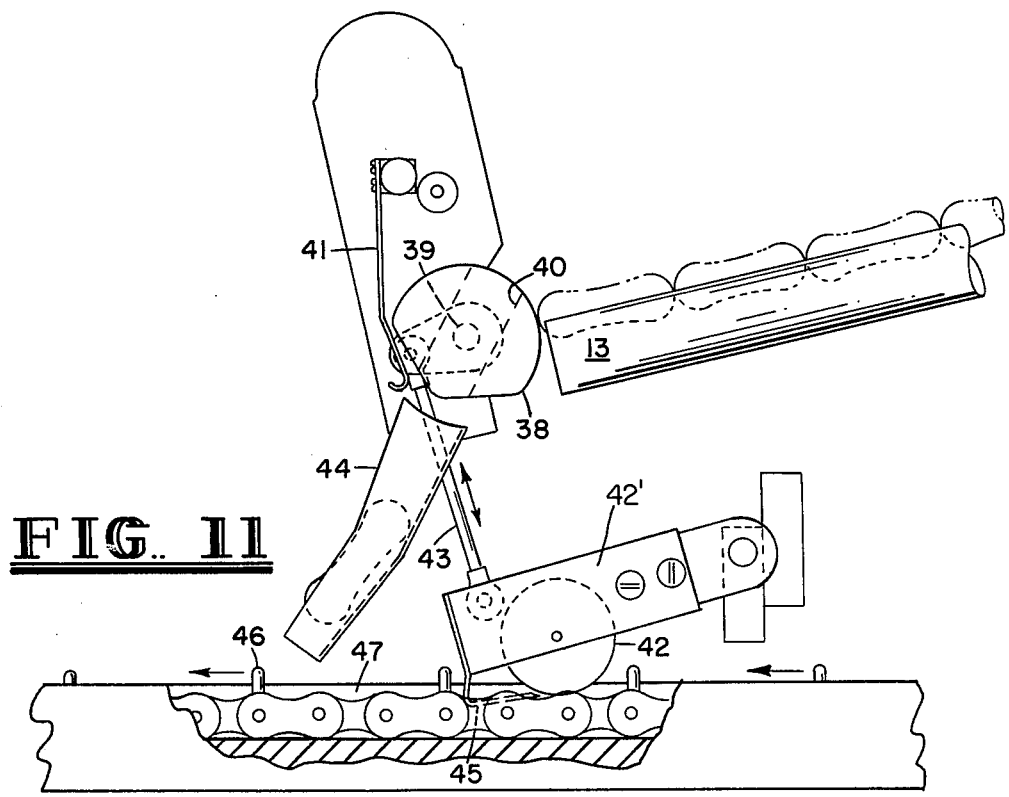

APPARATUS FOR ORIENTING OBLONG ARTICLES

BACKGROUND OF THE INVENTION

1. Field of the Invention

This invention generally pertains to a device for orienting oblong articles in a production line for automated packaging or wrapping. The specific device of this invention was developed to receive pieces of candy from a conveyor, orient the pieces and place them on a link conveyor, to be processed through a wrapping machine. The device generally pertains to an orienting machine for placing articles in a select position on a conveyor.

2. Description of Prior Art

Numerous devices performing similar functions have been heretofore developed and patented. The device of this invention utilizes a rotating drum receiving items from a belt conveyor positions the items on a counter-rotating shaft conveyor which feeds the individual items to a chain link conveyor. Among the U.S. patents possessing similarities in structure and mode of operation is the U.S. Pat. No. to Cover et al., 3,874,498, pertaining to an apparatus or method for orienting articles having at least one tapered end. A related patent also is Magnuson, U.S. Pat. No. 2,534,362, employing rollers to orient an article. Also, a related invention is U.S. Pat. No. to Shackelford, 2,193,942, which also utilizes rollers as a conveyor.

CROSS REFERENCE TO RELATED APPLICATIONS

This application has some relationship to the inventor's prior U.S. application Ser. No. 909,787 filed May 26, 1978, now U.S. Pat. No. 4,205,743. The devices serve similar purposes; however, structurally and in mode of operation the device of this invention has little relationship to the previous patent application entitled "Conveyor Feeder for Candy Eggs."

SUMMARY OF THE INVENTION

The device of this invention is designed to be secured to a mounting frame 10 suitable to being integrated into a production line in a candy factory or similar environment. The device of this invention comprises a rotating drum 11 receiving articles to be oriented from a feed conveyor 12. Articles in the drum are dropped on counter-rotating shaft conveyor 13, which rejects all but properly oriented pieces and passes the articles from the rotating drum 11 down counter-rotating shaft conveyor 13 through the discharge opening 18 to a chain link conveyor 37. Feed control flaps 20 are pivotally mounted adjacent discharge opening 18 of rotating drum 11 and in their functions regulate the rate of feed conveyor 12 plus returning the articles which fall off the rotating shafts back to the rear of the drum. To insure a constant uniform flow of articles being oriented and placed on the counter-rotating shaft conveyor 13 and to insure thorough and complete loading of spaces on the chain link conveyor 37, a shaft conveyor light source 30 and a shaft conveyor electric eye 31 are positioned above and below a space in counter-rotating shaft 13 adjacent the discharge opening 18 of rotating drum 11. In the event a constant flow of articles being oriented are not proceeding down shaft conveyor 13, a solenoid activates an air jet 34 which would immediately remove a jam of two articles wedged in opening on shaft conveyor 13 which can on occasions occur internal of rotating drum 11 adjacent discharge opening 18. The device of this invention also includes a synchronized or coordinated chain link loading mechanism 36 which includes a receiving wheel 38, loading chute 39, and a trip roller 42 insuring placing of an article being oriented in each article receiving space 47 on a chain link conveyor 37.

BRIEF DESCRIPTION OF THE DRAWINGS

For a detailed description of the construction of the device of this invention and its mode of operation, reference is made to the attached drawings wherein several views will utilize identical reference characters to refer to identical or equivalent components throughout the several views and the following detailed description of the method of construction of the device and its mode of operation.

FIG. 1 is a side, perspective view of the composite device positioned schematically on a production line.

FIG. 2 is a cross-sectional view of the roller conveyor taken on line 2—2 of FIG. 1 looking in the direction of the arrows.

FIG. 10 is a fragmented view of the chain link conveyor loading mechanism illustrating the receiving wheel in the loading position.

FIG. 11 is a view illustrating the receiving wheel in the release position.

DETAILED DESCRIPTION OF THE INVENTION

Figure 8:
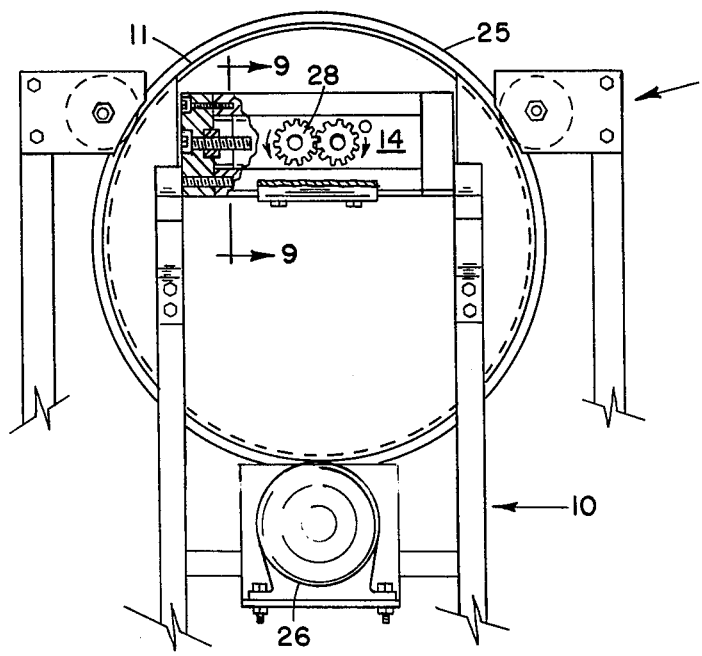
FIG. 8 is a fragmented view illustrating the shaft adjusting spacer for the shaft conveyor.
Figure 9:
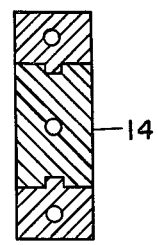
FIG. 9 is a fragmented, sectional view of a sliding mechanism incorporated in the shaft adjusting spacer.

For a detailed description of the construction of the device of this invention, reference is made first to FIG. 1. The mounting frame 10 is constructed on one inch square steel tubing. The components may be welded or secured by other conventional fastening means. The rotating drum 11 is approximately 18" in diameter and 2' long. This construction is primarily of sheet stainless approximately 0.078" thick. The method of supplying articles to be processed to the rotating drum 11 of this invention is a belt feed conveyor 12. The articles are fed into the rotating drum 11 and by tumbling, lifting action placed on counter-rotating shaft conveyor 13. This shaft conveyor projects through the drum 11 and slopes downward to the chain link loading mechanism 35 which will be further described in detail. The counter-rotating shaft conveyor 13 is constructed of one inch hollow stainless steel tubing. In view of the fact that the invention of this device is designed to sort and handle oblong articles of various sizes, means of adjusting the spacing between the counter-rotating shafts 13 must be provided. This is accomplished by the shaft adjusting spacer 14 as illustrated in FIGS. 8 and 9. Also projecting the length of the counter-rotating shaft conveyor 13 is adjustably positioned a shaft cover plate 15 as illustrated in FIG. 2. This cover plate 15 holds the articles in position along the counter-rotating shafts as they progress downward toward the chain link loading mechanism 36.

Figure 6:
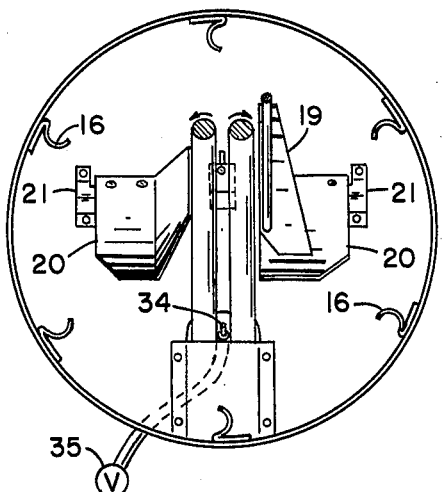
FIG. 6 is an internal view of the rotary drum illustrating the tilt flaps controlling the rate of feed from the belt feed conveyor and return of articles to the rear of the drum.

For an illustration and description of the internal operation of rotating drum 11, reference is made particularly to FIGS. 1 and 6. Secured to the interior of rotating drum 11 are a series of lifting fins 16 which project substantially the length of rotating drum 11 and are constructed in the general configuration illustrated in FIG. 6. Articles placed in drum 11 by feed conveyor 12 through feed opening 17 are lifted by the cup-shaped lift fins 16 and are processed through discharge opening 18 along the counter-rotating shaft conveyor 13. To assist in placing the articles on the counter-rotating shaft conveyor 13 a collector flap 19 as illustrated in FIG. 6 projects upward and at an angle to counter-rotating shaft 13. This fixed deflector 19 is constructed of stainless steel and movably mounted in rotating drum 11 projecting upward and outward. Deflector 19 is fixed and secured adjacent to the two feed control tilt flaps 20 illustrated in FIG. 6. These flaps 20 are mounted on pivot 21. In view of the fact that the feed control tilt flaps 20 must be activated by relatively light articles striking their surface, a flap balance weight 22 as illustrated in FIG. 1 is provided to cause the mechanism to tilt rather easily. As a feed control tilt, flaps 20 tilt the feed conveyor control switch 23, which is a microswitch mounted on a plate adjacent the discharge opening 18 of rotating drum 11.

Figure 7:
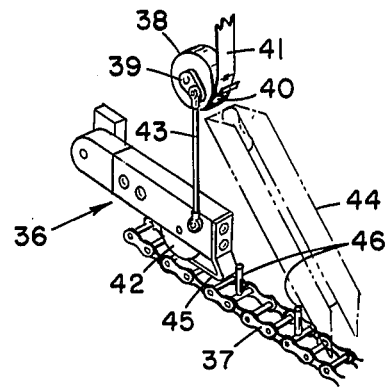
FIG. 7 is a view of the chain link conveyor loading mechanism as viewed from the right hand side, i.e., the opposite of FIG. 5.

To provide for rotation of drum 11, the frame structure 10 includes a drum rotating frame 24 constructed in a configuration as substantially illustrated in FIG. 1. Encompassing the structure of drum rotating frame 24 may include a roller-like structure as illustrated in FIG. 7, which engages drum rotating ring 25 as is perhaps best illustrated in FIG. 8. Contacting this drum rotating ring 28 at the bottom or base of rotating drum 11 is drum reduction drive motor 26. The drive mechanism may include a contact roller having configurations substantially as illustrated in FIGS. 7 and 8. This roller is mounted on a shaft which is rotated by drum reduction drive motor 26. This motor 26 has constructed internally a reduction drive gear or transmission (not shown) which reduces the rate of rotation of the output shaft to an acceptable rpm. In the operation of the device of this invention, candy or similar articles to be dropped on counter-rotating shaft conveyor 13 proceed through the drum and as drum 11 rotates the articles are lifted by lifting fins 16 and dropped against deflector 19 and deflected onto the counter-rotating shaft conveyor 13. The articles that are rejected fail on control tilt flap 20 and are returned to the rear of the drum to be picked up by vanes and again dropped on counter-rotating shaft conveyor 13. When not enough articles of candy are striking feed control tilt flaps 20, these flaps through their counterbalanced weight 22 move upward which activates feed conveyor control switch 23, which causes feed conveyor 12 to supply additional articles to the rotating drum. This combined mechanism contributes substantially to the success of the operation of the device of this invention. Counter-rotating shaft conveyor 13 is driven by shaft conveyor drive motor 27 which is coupled directly to one of the counter-rotating shafts of shaft conveyor 23. Interconnecting the two counter-rotating shafts is an adjustable shaft transmission 28 as illustrated in FIG. 8. The spacing of these counter-rotating shafts is accomplished through adjustments provided in construction of shaft adjusting spacer 14 illustrated in FIGS. 8 and 9. If a wider spacing is desired for processing substantially larger articles, larger gears may be utilized in the shaft transmission 28. The structure of this device will permit utilization of gears of larger diameter having more teeth, if desired.

In operating the device of this invention and in its development, it was discovered that on occasions two oblong articles being sorted may wedge under cover over counter-rotating shaft conveyor 13 and, in effect, jam the discharge at the discharge opening 18. To alleviate this problem, a combination is developed including detector means 29 as illustrated in detail in FIG. 2 and suggested in FIG. 1. This mechanism comprises a shaft conveyor light source 30 positioned below the counter-rotating shaft conveyor 13 adjacent the discharge opening 18 and the shaft conveyor electric eye 31 positioned above counter-rotating shaft conveyor 13. Utilized in association with this detection means 29 is a shaft conveyor clearing means 32 which operates responsive to the detection means 29. This clearing means 32 comprises or utilizes an external source of compressed air 33, which supplies air to air jet 34 positioned below counter-rotating shaft conveyor 13 and projects upward into discharge opening 18. The admitting of air to the air jet 34 is controlled by solenoid valve 35 which through its electronics incorporates a time delay and pulsing feature. If air jet 34 is continually operated in a rapid pulsating fashion, the device of this invention would not be successful. Accordingly, a built-in time delay is incorporated to such a degree in a manner to operate or pulsate only after the two or three-tenths of a second continual activation of the electric eye 31 by light source 30. Such a delay would tend to indicate that the stoppage has occurred adjacent discharge opening 18. When air jet 34 pulsates, these light articles being sorted (such as pieces of candy) are removed from the immediate area of discharge opening 18.

Figure 3:
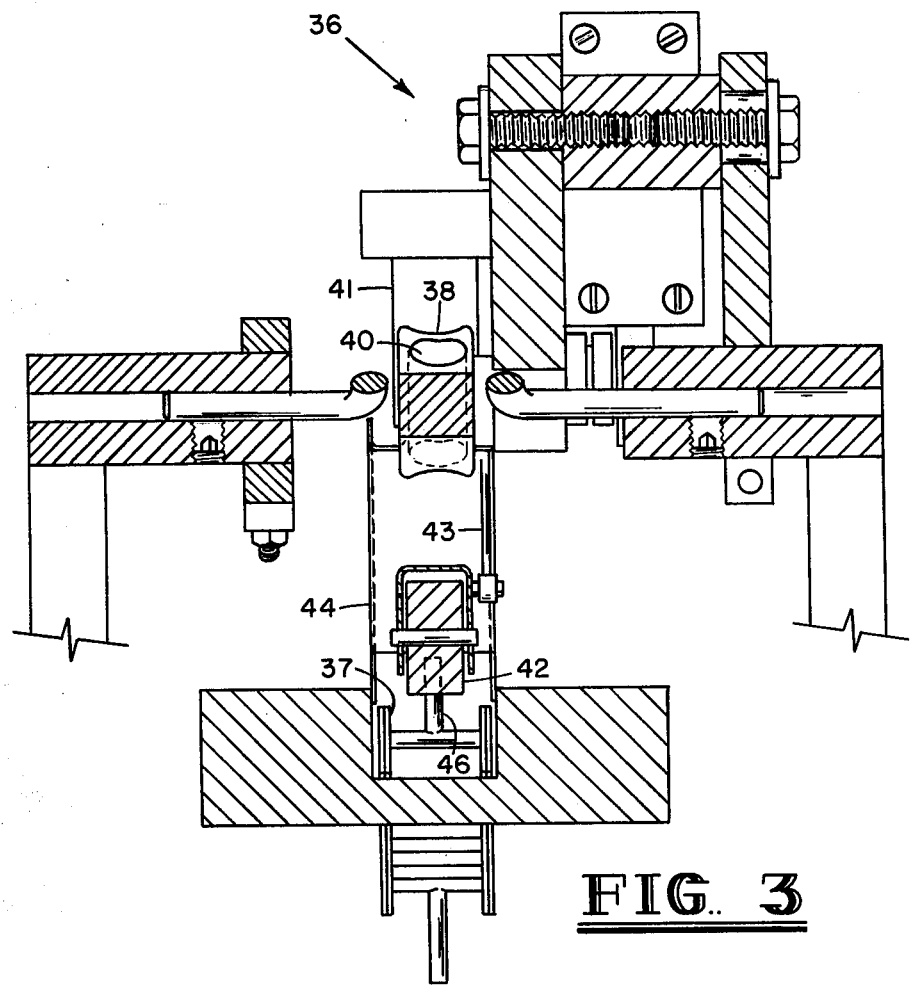
FIG. 3 is a fragmented, partially sectional view of the chain link loading mechanism.
Figure 4:
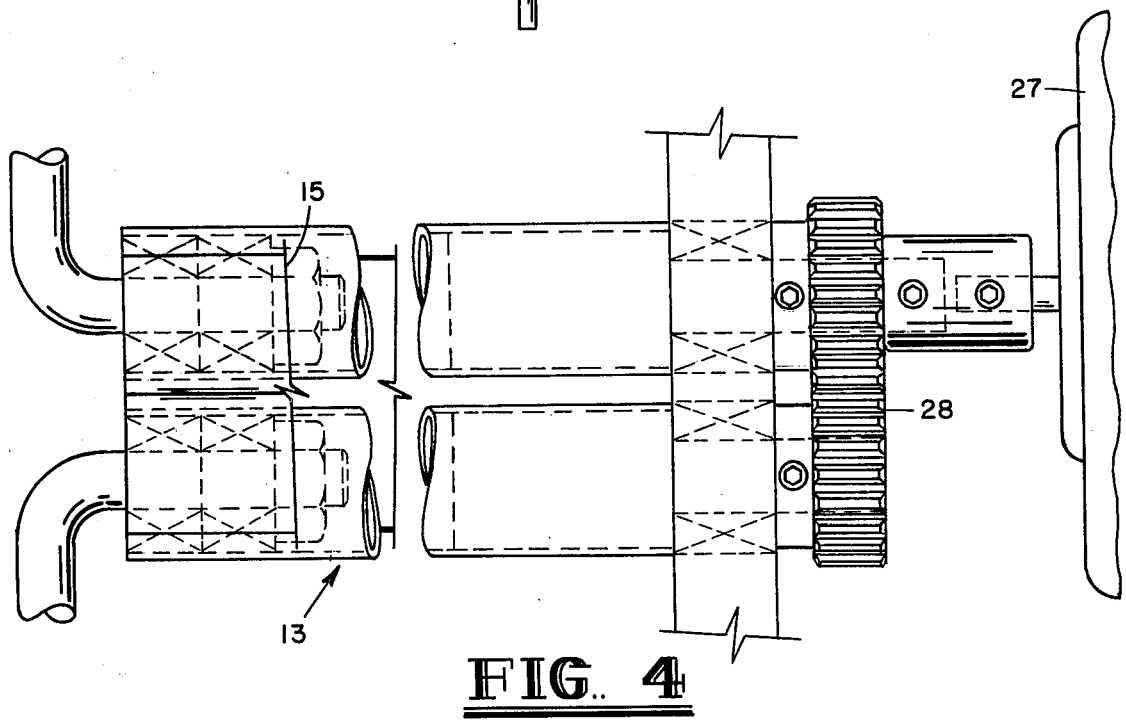
FIG. 4 is a fragmented view of the counter-rotating shaft conveyor.
Figure 5:
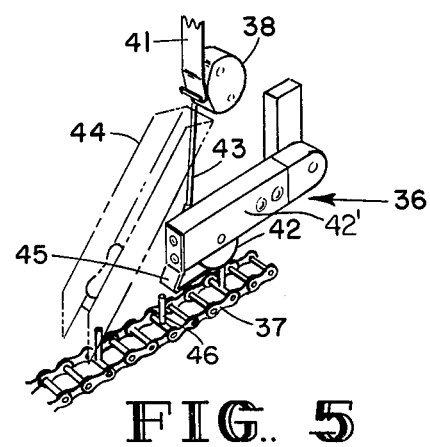
FIG. 5 is a fragmented view of chain link conveyor loading mechanism as viewed from the left hand side.

The work product of the device of this invention is a series of oblong articles proceeding in line down counter-rotating shaft conveyor 13. These articles as they proceed down shaft conveyor 13 are positioned on a chain link conveyor 37 by chain link loading mechanism 36. This mechanism is perhaps best illustrated in FIGS. 1, 3, and 5. Articles being processed by the counter-rotating shaft conveyor 13 project into receiving wheel 38 as perhaps best illustrated in FIGS. 3 and 5.

The device of this invention normally operates in conjunction with a chain link conveyor 37 which projects or carries the oriented oblong articles from the device of this invention to a mechanical wrapping machine. In handling articles such as small pieces of candy, chain link conveyor 37 would normally be constructed with upward projecting link trip pins 46 dividing the chain link conveyor into four-inch compartments. The work product of the drum portion of this invention, as they proceed down the counter-rotating shaft conveyor 13, project into receiving wheel 38 which is mounted on a wheel shaft 39. This receiving wheel 38 would normally be constructed of some light metal alloy, such as aluminum and would have a configuration as substantially illustrated in FIGS. 3 and 5, and includes a receiving wheel opening 40 arcuately projecting downward and following the general contour of the circumference of the receiving wheel 38 is an article stop 41. This component of the structure retains the articles projecting into receiving wheel opening 40 until the wheel is rotated. The rotating of receiving wheel 38 is accomplished by a mechanical linkage operating in coordination with a chain link conveyor 37 and the link trip pins 46. Trip roller 42 is mounted on a roller arm 42' which projects in a wheelbarrow-like fashion against the direction of the movement of chain link conveyor 37. Trip roller 42 rides along the surface of chain link conveyor 37 and along and over the link trip pins 46. To further retain the receiving wheel 38 in the rotated or trip position, the trip roller delay plate 45 projects along the trip roller mounting arm generally parallel to the chain link conveyor 37. This trip roller delay plate 45, by a contact with link trip pins 46, retains the trip roller arm in the lifted position until it clears the link trip pins 46. This structure is so adjusted through trip linkage 43 as to retain the receiving wheel in the tilted position approximately 50 percent of the time. When the trip roller delay plate 45 clears link trip pin 46 and moves downward into the opening, which comprises the article receiving space 47, receiving wheel 38 assumes its original position and places the receiving wheel opening 40 in prolongation of the counter-rotating shaft conveyor 13 for receiving another article being processed. The surface of the receiving wheel 38 having no aperture retains the article being processed adjacent the end of the counter-rotating shaft 13 until the receiving wheel opening 40 is in line with the article to be received. As the chain link conveyor moves past the chain link loading mechanism 36, one properly oriented, oblong article is placed in each article receiving space 47. These articles proceed from receiving wheel opening 40 down loading chute 44 and fall into position between the link trip pins 46 and article receiving space 47.

OPERATION OF THE DEVICE

The device of this invention is designed for utilization in a production line in a candy factory. The device is primarily designed to receive articles from a belt feed conveyor 12. The movement of the feed conveyor 12 is controlled by feed conveyor control switch 23 which is activated by feed control flaps 20. The primary purpose of this invention is to receive oblong articles and position them on a counter-rotating shaft conveyor 13. The characteristic of the counter-rotating shaft 13 tends to reject articles which are not in line with the direction of the projection of the counter-rotating shaft conveyor 13. The articles received move down counter-rotating shaft conveyor 13 and are placed in the receiving wheel opening 40 in the receiving wheel 38. The chain link loading mechanism 36 includes means for positioning receiving wheel 38 and receiving wheel opening 40 to accept articles from the counter-rotating shaft conveyor 13. These articles are placed in receiving wheel opening 40 and as chain link conveyor 37 moves past the chain link loading mechanism 36, trip roller 42 contacts the link trip pin 46 and rides up and over the point of the trip link pin 46. The result of this trip roller action releases articles from receiving wheel opening 40 each time a link trip pin passes the loading chute 44. This assures the uniform and constant loading of the chain link conveyor 37. In a normal operating environment, the chain link conveyor 37 would proceed to an automatic wrapping mechanism, which is not a part of this particular invention. The wrapping machine will normally seal the articles in transparent, plastic cover and cut and release the articles wrapped in individual packages.

The device of this invention is useful in arranging a series of round articles to be wrapped in an oblong package. The chain link loading mechanism 36 may, by the selection of a diameter receiving wheel 38 with an appropriate receiving wheel opening 40, receive a multiplicity of round items in the receiving wheel opening 40 and position these items in an elongated arrangement on the chain link conveyor 37. In such a utilization, the article receiving space 47 in the chain link conveyor 37 can be filled with an arranged series of round items and conveyed to an automatic wrapping machine.

The device of this invention has been illustrated in the respective drawings in detail and its construction and operation fully described. Certain modifications to the device of this invention would be apparent from a study of the drawings, description, and the appended claims. What is desired to be claimed is all modifications of this invention not departing from the scope of equivalents of the invention as defined in the appended claims.

I claim:
1. An article aligning device comprising:
    a. a rotating drum including a feed opening and a discharge opening adapted to receive articles from an input conveyor,
    b. a counter-rotating shaft conveyor projecting through said drum adapted to receive articles in said drum and move articles to,
    c. a loading mechanism adapted to position individual articles on an output conveyor, and
    d. feed control tilt flaps tiltably mounted in said drum and adapted to control the rate of feed of a conveyor.
2. The invention of claim 1 comprising a deflector mounted adjacent said counter-rotating shaft conveyor, said deflector positioned to deflect articles toward said shaft conveyor.
3. The invention of claim 1 further comprising:
    a. sensing means capable of detecting an absence of articles on said counter-rotating shaft conveyor,
    b. an external source of compressed air,
    c. an air jet positioned adjacent the discharge opening of said rotating drum, said air jet being so positioned as to clear a jam on said shaft conveyor adjacent said discharge opening, and
    d. valve means operating responsive to said sensing means adapted to control the admission of air through said air jet positioned adjacent discharge opening and said counter-rotating shaft conveyor.
4. The invention of claim 1 wherein said loading mechanism is a chain link loading mechanism.
5. The invention of claim 4 wherein said chain link loading mechanism comprises:
    a. a receiving wheel accepting individual articles from said shaft conveyor,
    b. trip means releasing said articles from said receiving wheel.
6. The invention of claim 5 comprising a chute conveying said articles from said receiving wheel to a chain link conveyor.
7. The invention of claim 5 comprising a trip roller adapted to contact pins on a chain link conveyor and thereby controlling said receiving wheel.
8. The invention of claim 7 comprising a trip roller delay plate mounted adjacent said trip roller, said delay plate contacting said chain link conveyor.

9. The invention of claim 7 comprising a trip linkage interconnecting said trip roller and said receiving wheel.

10. A device for placing oblong articles on a packaging conveyor, said device being constructed to receive said oblong articles from a manufacturing conveyor, said device comprising:
   a. rotatable cylinder means having openings in each end thereof, a first opening in a first of said ends being constructed to receive said oblong articles from said manufacturing conveyor;
   b. counter-rotating rods being approximately parallel to each other and spaced a small distance apart horizontally with a first end extending at an incline into a second opening in a second of said ends of said rotatable drum, upon rotation of said rotatable cylinder means having said oblong articles therein, said oblong articles falling on said counter-rotating rods and progressing down said incline to a second end of said counter-rotating rods;
   c. feed control means mounted in said rotatable cylinder and adapted to control the rate of feed of said manufacturing conveyor; and
   d. means for removing said oblong articles from said second end of said counter-rotating rods and placing on said packing conveyor.

11. The device as recited in claim 10 wherein said counter-rotating rods rotate upward and outward with respect to a top of said counter-rotating rods.

12. The device as recited in claim 10 further comprising a deflector flap mounted adjacent said counter-rotating shaft conveyor, said deflector flap deflecting articles toward said shaft conveyor.

13. The invention of claim 10 further comprising:
   a. sensing means capable of detecting an absence of articles on said counter-rotating shaft conveyor,
   b. an external source of compressed air,
   c. an air jet positioned adjacent the discharge opening of said rotating drum, said air jet being so positioned as to clear a jam on said shaft conveyor adjacent said discharge opening, and
   d. valve means operating responsive to said sensing means adapted to control the admission of air through said air jet positioned adjacent discharge opening and said counter-rotating shaft conveyor.

14. The invention of claim 10 wherein said means for removing oblong articles comprises:
   a. a receiving wheel accepting individual articles from said shaft conveyor,
   b. trip means releasing said articles from said receiving wheel.

15. The device of claim 10 wherein said feed control means comprise tiltably mounted tilt flaps.

* * * * *